US008302699B2

(12) United States Patent
Rocca

(10) Patent No.: US 8,302,699 B2
(45) Date of Patent: Nov. 6, 2012

(54) PLASTIC MULCH RETRIEVER

(75) Inventor: Antonio Roberto Rocca, Tolga (AU)

(73) Assignee: Rocca Manufacturing Pty Ltd, Queensland (AU)

( * ) Notice: Subject to any disclaimer, the term of this patent is extended or adjusted under 35 U.S.C. 154(b) by 145 days.

(21) Appl. No.: 12/808,601

(22) PCT Filed: Dec. 17, 2008

(86) PCT No.: PCT/AU2008/001916
§ 371 (c)(1),
(2), (4) Date: Jun. 16, 2010

(87) PCT Pub. No.: WO2009/076729
PCT Pub. Date: Jun. 25, 2009

(65) Prior Publication Data
US 2011/0000687 A1      Jan. 6, 2011

(30) Foreign Application Priority Data

Dec. 17, 2007  (AU) ................................ 2007906889
Oct. 15, 2008  (AU) ................................ 2008905335

(51) Int. Cl.
*A01G 13/02* (2006.01)
(52) U.S. Cl. ........................................................ 171/45
(58) Field of Classification Search .................... 171/53, 171/138, 1, 45, 62, 74, 83; 172/20, 21, 19, 172/33, 50, 63; 100/7, 18, 91, 100, 138, 100/139, 180, 187, 189, 250; 414/786, 501, 414/502, 523, 528, 518, 525.2
See application file for complete search history.

(56) References Cited

U.S. PATENT DOCUMENTS

| | | | |
|---|---|---|---|
| 3,175,621 A * | 3/1965 | Kappelmann et al. | 171/53 |
| 3,181,455 A * | 5/1965 | Gouker et al. | 100/97 |
| 3,935,904 A * | 2/1976 | Beck | 172/20 |
| 4,796,711 A | 1/1989 | Chrysler | |
| 5,236,051 A | 8/1993 | Sawyer et al. | |
| 5,336,036 A * | 8/1994 | Williamson et al. | 414/502 |
| 5,386,876 A | 2/1995 | Lavo | |
| 5,452,652 A * | 9/1995 | Brooks | 100/7 |

FOREIGN PATENT DOCUMENTS

JP        3-262422 A      11/1991

OTHER PUBLICATIONS

Printed in the Chinese Selected Master's Dissertations Theses Full-Text Databases, Mar. 1, 2005, 56 pages, No. 20050301.

* cited by examiner

*Primary Examiner* — Robert Pezzuto
(74) *Attorney, Agent, or Firm* — Standley Law Group LLP

(57) ABSTRACT

A plastic mulch retriever comprising a body and at least one cutting or digging element mounted to the body to loosen plastic mulch embedded in the ground. A conveyor is mounted to the body rearward of the at least one cutting or digging elements to engage the loosened plastic mulch and remove at least some of the ground material attached to the extracted plastic mulch. At least one storage device is mounted to the body rearward of the conveyor to store the retrieved plastic mulch.

12 Claims, 4 Drawing Sheets

PLASTIC MULCH RETRIEVER

FIELD OF THE INVENTION

Embodiments of the present invention relate generally to agricultural machinery. In particular, embodiments of the present invention relate to a plastic mulch retriever.

BACKGROUND TO THE INVENTION

Agricultural machinery is commonly used by farmers, crop growers and others to improve the efficiency of planting and harvesting crops. Some crops are grown with the aid of irrigation systems, such as trickle irrigation, and plastic sheeting known as plastic mulch, which are at least partially embedded in the ground at the start of the growing period. Plastic mulch provides a range of benefits including helping modulate soil temperature, reduce soil erosion, evaporation, fertilizer leaching and weed problems and increase produce quality and yields. When the crops are harvested, the plastic mulch and often the irrigation system need to be removed from the ground for disposal. Plastic mulch retrievers are agricultural machines designed for this purpose and are typically drawn behind a powered vehicle, such as a tractor. Plastic mulch retrievers are available in a range of designs, the main features of which will now be discussed.

One known plastic mulch retriever comprises a pair of coulter wheels at a front end, which cut into the ground and plant matter, such as roots. A pair of angled, substantially horizontal blades mounted rearward of the coulter wheels also cut into the ground and underneath the plastic mulch embedded in the ground. As the mulch retriever is pulled along behind the powered vehicle, the mulch is unearthed and left lying loosely on top of the planting bed. A centre coulter wheel rearward of the pair of coulter wheels slices the plastic mulch into two halves. The positions of the coulter wheels are adjustable to accommodate different size planting beds. One drawback of this mulch retriever is that the unearthed mulch needs to be collected for disposal, which is labour intensive and inefficient because the unearthed mulch remains strewn along the growing area.

A modification to the aforementioned mulch retriever comprises a plurality of propane burners rearward of the coulter wheels and angled blades. The burners incinerate the unearthed mulch thus avoiding the need to collect the unearthed mulch. However, incineration is environmentally unfriendly and illegal in some jurisdictions. The burners also require a propane tank, which adds to the both the financial and environmental cost.

In another plastic mulch retriever design, the unearthed mulch is rolled onto a pair of aligned, rotating rollers rotatably mounted toward a rear of the mulch retriever on a pair of longitudinal arms. An operator stands on a platform to control the speed of rotation of the rollers to be commensurate with the speed of the powered vehicle and the rate at which the mulch is being unearthed. Once all of the mulch has been retrieved or the rollers are full, each arm comprising one of the respective rollers is swung outwardly and the rollers separate about a substantially central point allowing the retrieved mulch bundle wrapped around the rollers to fall to the floor for disposal.

Whilst the aforementioned plastic mulch retriever is effective at retrieving the embedded mulch, one problem that is experienced is the plastic mulch retains a lot of soil, roots, debris and the like. It is desirable to minimize the amount of earth removed during plastic mulch retrieval to minimize the amount of nutrients removed from the soil. The earth attached to the removed mulch also adds to the weight of the bundle for disposal. Furthermore, the capacity of the rollers for capturing the plastic mulch is reduced because the attached earth occupies some of the volume. It will be appreciated that clods of earth, debris and the like occupy significantly more volume than plastic sheeting. Therefore, efficiency is affected because more stops must be made to empty the rollers than would otherwise be necessary.

OBJECT OF THE INVENTION

It is an object of the present invention to provide a plastic mulch retriever that addresses or at least ameliorates one or more of the aforementioned problems of the prior art or provides consumers with a useful commercial alternative.

SUMMARY OF THE INVENTION

According to one aspect, although not necessarily the broadest or only aspect, embodiments of the present invention reside in a plastic mulch retriever comprising:
 a body;
 at least one cutting or digging element mounted to the body to loosen plastic mulch embedded in the ground;
 a conveyor mounted, to the body rearward of the at least one cutting or digging elements to engage the loosened plastic mulch and remove at least some of the ground material attached to the extracted plastic mulch; and
 at least one storage device mounted to the body rearward of the conveyor to store the retrieved plastic mulch.

Preferably, the conveyor comprises a plurality of substantially transverse bars Comprising one or more projections for engaging the loosened plastic mulch.

Alternatively, the substantially transverse bars engage the loosened plastic mulch.

Suitably, the at least one cutting or digging element comprises one or more substantially vertically mounted coulter wheels and/or one or more substantially horizontally mounted angled cutting blades.

Suitably, the at least one cutting or digging element comprises one or more blades substantially aligned with elongate side members of the body and angled toward the ground.

Preferably, the storage device comprises a pair of rollers rotatably mounted to the body, the pair of rollers releasably connected by a locking mechanism.

Preferably, the retrieved plastic mulch passes first over the top of the rollers and then underneath the rollers as the plastic mulch is wrapped around the rollers.

Suitably, a speed of rotation of the rollers is adjustable and is adjusted according to a speed of the plastic mulch retriever and/or a diameter of a bundle of mulch on the rollers.

Preferably, one or more of the following are adjustable: a position at which the conveyor is mounted to the body; a height of the conveyor relative to the body and the ground; an angle of inclination of the conveyor relative to the body.

Preferably, the body comprises a pair of spaced apart elongate side members, at least one of the elongate side members being in two parts joined together by a hinge allowing one part to which one of the rollers is mounted to pivot relative to the other part.

Further features and aspects of the present invention will become apparent from the following detailed description.

BRIEF DESCRIPTION OF THE DRAWINGS

Embodiments of the present invention will now be described with reference to the accompanying drawings, which are provided by way of example only, wherein.

DETAILED DESCRIPTION OF THE INVENTION

Figure 1:
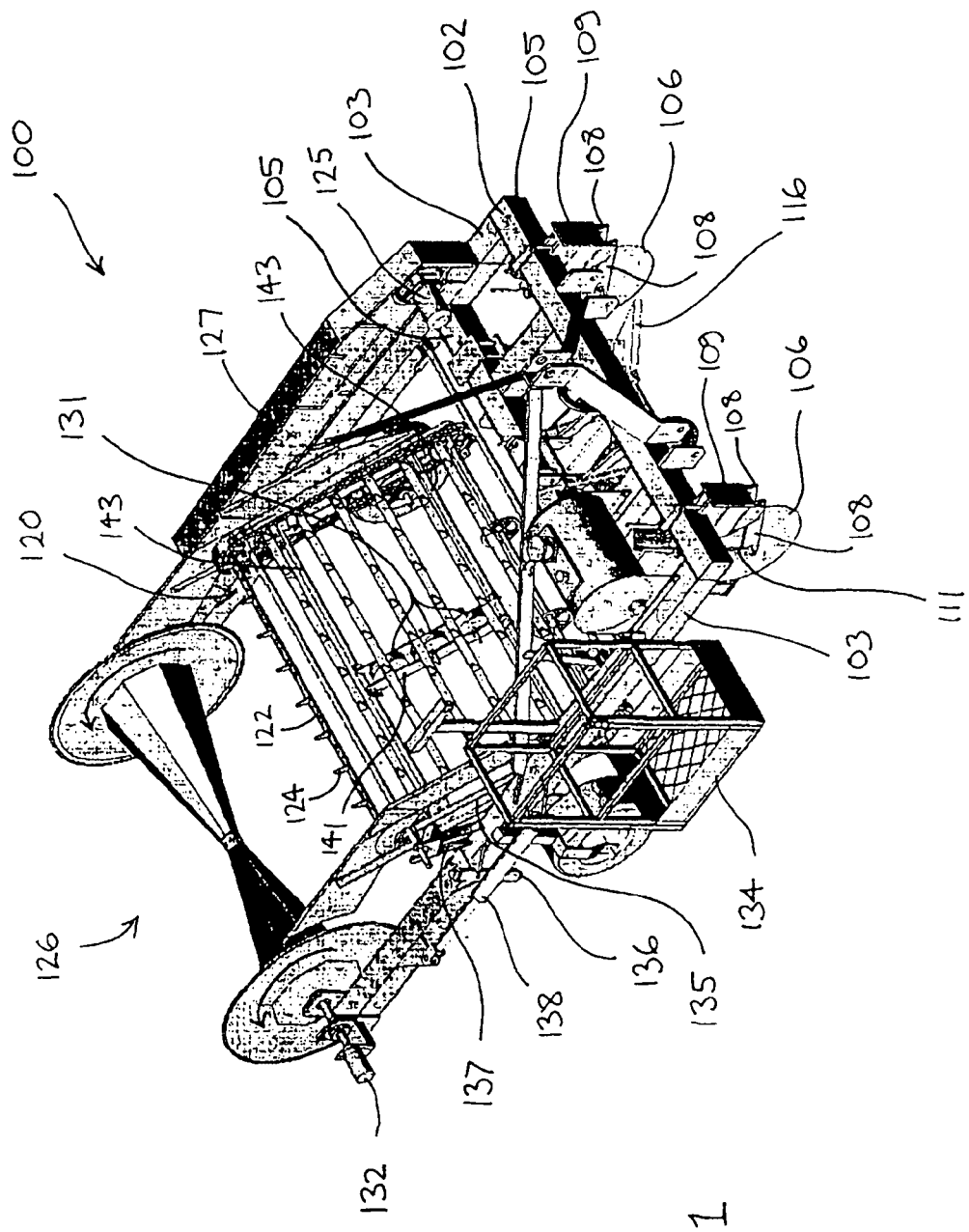
FIG. 1 is top side perspective view of the plastic mulch retriever according to embodiments of the present invention.

Like features in the drawings are identified by like reference numerals. It should be appreciated that in order to aid clarity, the plastic mulch has been omitted from FIGS. 1-3. However, the plastic mulch is shown the schematic drawing in FIG. 4.

Figure 2:
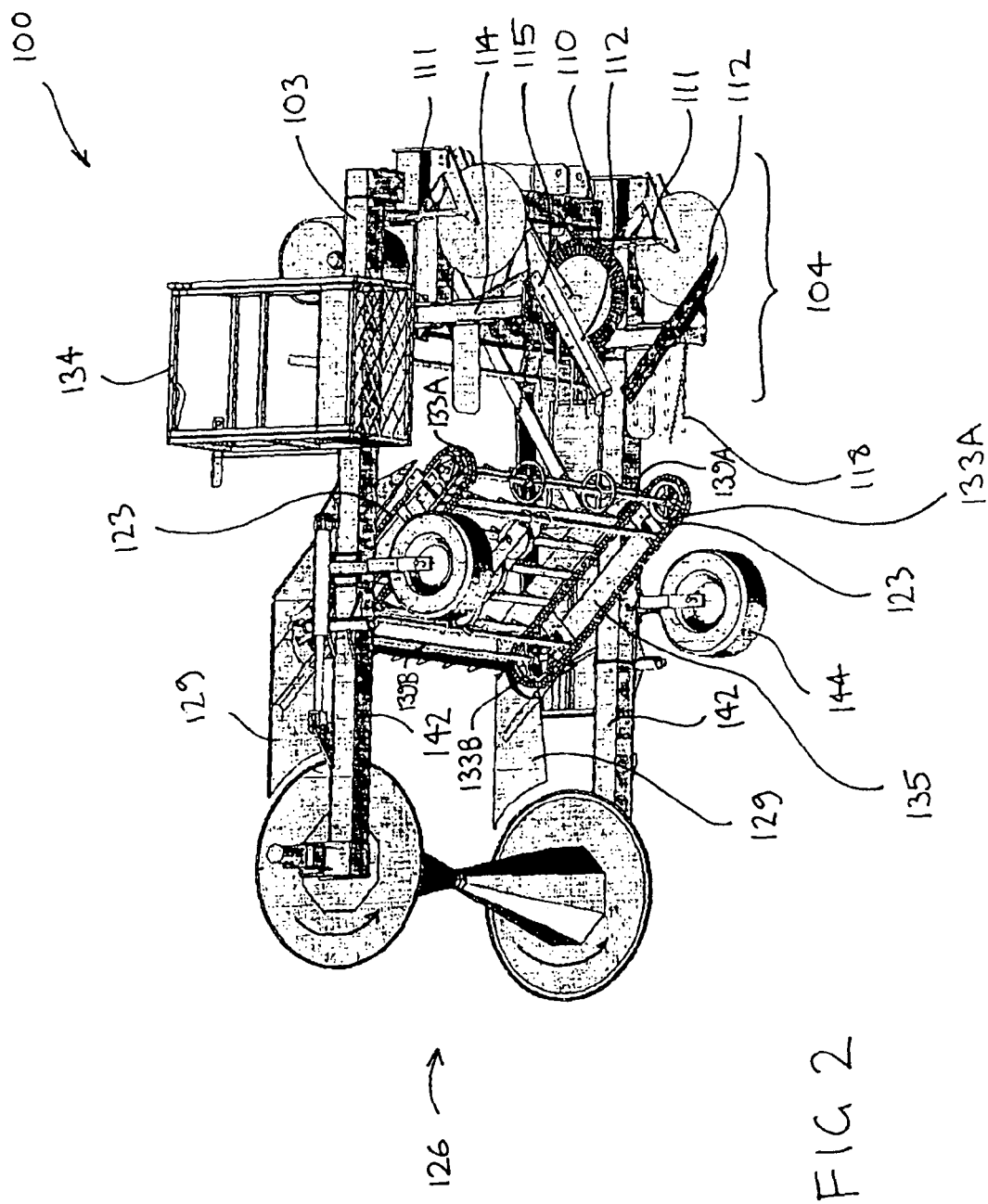
FIG. 2 is an underside perspective view of the plastic mulch retriever shown in FIG. 1.
Figure 3:
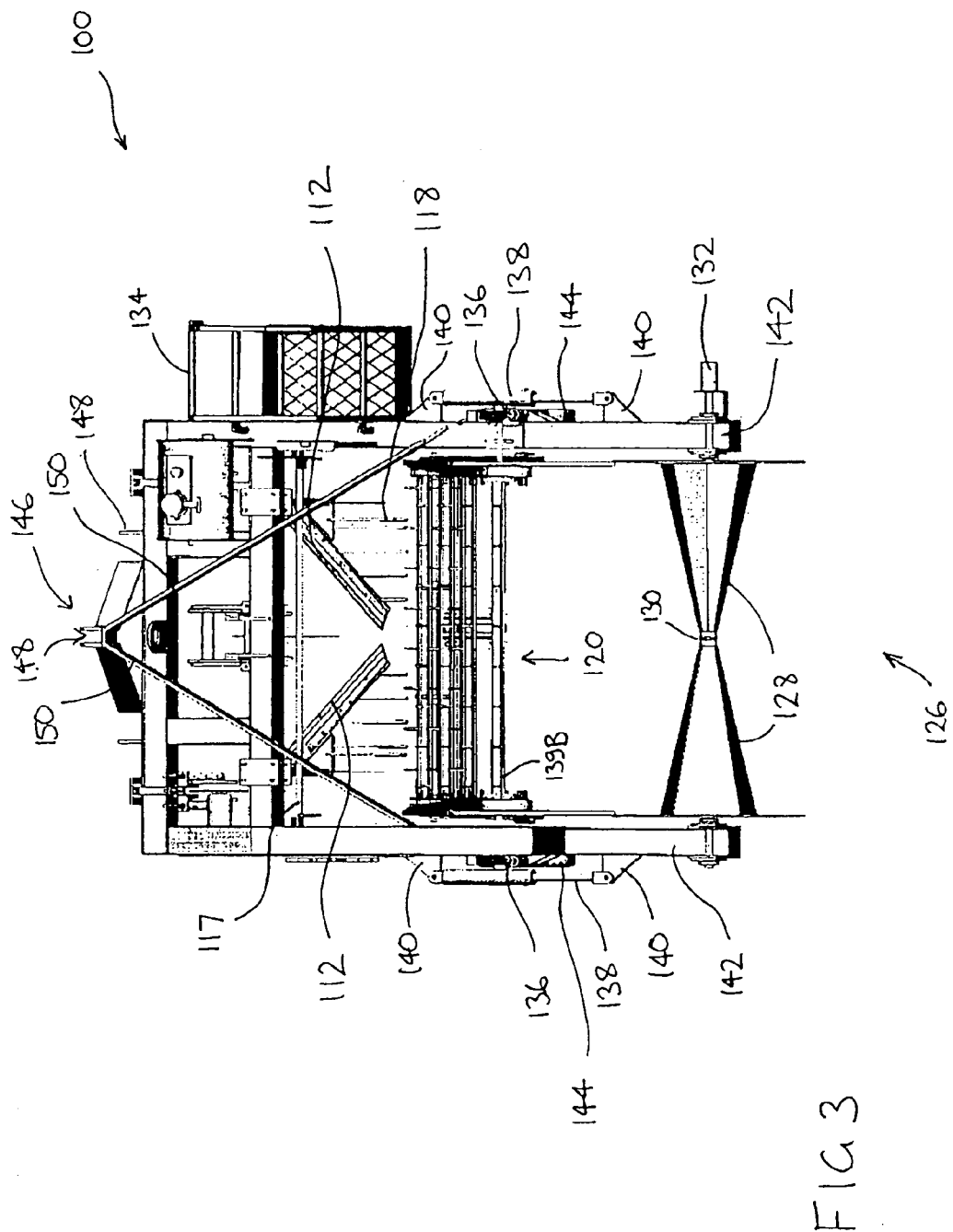
FIG. 3 is a plan perspective view of the plastic mulch retriever shown in FIG. 1.

With reference to FIGS. 1-3, a plastic mulch retriever 100 in accordance with embodiments of the present invention comprises a body 102 formed from any suitable grade steel or similar material familiar to the skilled addressee. According to some embodiments, the body 102 is formed from a plurality of elongate members having a hollow box frame construction. In the embodiment shown, the body 102 comprises a pair of spaced apart elongate side members 103 welded, bolted or otherwise attached to a pair of spaced apart elongate transverse members 105.

The plastic mulch retriever 100 comprises at least one, and in preferred embodiments, a plurality of, cutting or digging elements 104 mounted to the body 102 to loosen and extract plastic mulch embedded in the ground. According to some embodiments, the cutting or digging elements 104 comprise at least one, typically a pair, and in some embodiments, three or more, substantially vertically mounted coulter wheels 106. Coulter wheels 106 cut into the ground and define a channel of ground from which the plastic mulch will be retrieved. In the embodiment shown in FIGS. 1-3, a pair of coulter wheels 106 are provided, each coulter wheel rotatably mounted at the end of, and between, a pair of respective arms 108. Arms 108 are rotatably mounted to a respective bracket 109, each of which is adjustably mounted to a forward one of the elongate transverse members 105. Adjustable mounting of the brackets 109 can be provided by any suitable clamping arrangement. Suspension for each coulter wheel 106 is provided by a pair of rod mounted springs 111, one rod mounted spring 111 provided either side of the coulter wheel 106 and extending between the arms 108 and their respective bracket 109. The separation of the coulter wheels 106 provided either side of the body 102 along forwardmost transverse member 105 can be adjusted according to the size of the planting bed.

As shown most clearly in FIG. 2, according to some embodiments, a third coulter wheel 110 is rotatably mounted to one of the elongate transverse members 105 of the body 102 in a substantially central location of the body 102. Third coulter wheel 110 is rotatably mounted to the body 102 via respective arms 108, a respective bracket 109, and a respective pair of rod mounted springs 111 as described above in relation to coulter wheels 106. In this embodiment, third coulter wheel 110 is mounted substantially centrally to the rearmost transverse member 105.

Coulter wheels 106 cut plant matter such as roots and the like and other debris in the path of the mulch retriever and coulter wheel 110 cuts the extracted plastic mulch along its length for improved manipulation by the mulch retriever 100.

As most clearly shown in FIGS. 2 and 3, the cutting or digging elements 104 can also comprise one or more substantially horizontally mounted, angled cutting blades 112. In the embodiment shown, a pair of cutting blades 112 are mounted to one of the elongate transverse members 105 of the body 102 via a respective downwardly extending elongate support 114 comprising angled mounting bracket 115. Cutting blades 112 are angled with respect to each other and comprise self-cleaning, angled cutting edges 116, shown most clearly in FIGS. 1 and 3. A plurality of guides 118 in the form of steel rods of differing lengths extend from and rearward of the cutting blades 112 and the angled mounting bracket 115 to guide the extracted plastic mulch rearward of the cutting blades 112 as the mulch retriever 100 moves forward.

In alternative embodiments, the cutting blades 112 can be replaced with a series of blades angled toward the ground. The series of blades is substantially aligned with the elongate side members 103 and mounted to, for example, transverse member 117 extending between the elongate side members 103. Such an arrangement is known in the art as European shears. In a further alternative, instead of the series of blades, a single blade is provided extending substantially across the width of the body 102 between the elongate side members 103.

Mulch retriever 100 also comprises a conveyor 120 mounted to the elongate side members 103 of the body 102 rearward of the cutting or digging elements 104 to engage the extracted plastic mulch and remove at least some, preferably a substantial amount, if not most or all, of the ground material attached thereto. According to some embodiments, the mounting position of the conveyor 120 along the elongate side members 103, and thus the distance of the conveyor from the 120 from the cutting or digging elements 104, is adjustable. According to the embodiment shown in FIGS. 1-3, the conveyor 120 comprises a plurality of substantially transverse bars 122, referred to as rattler bars, attached at each end thereof at spaced intervals to looped chains 123. In the drawings, the transverse bars 122 on an underside of the chains 123 have been omitted for the sake of clarity. However, it should be appreciated that the transverse bars 122 are also present on the underside of the chains 123. The bars 122 comprise one, or more preferably a plurality of, projections 124 in the form of angled teeth at spaced apart intervals along the length of the bars 122 for engaging the extracted plastic mulch.

Looped chains 123 are engaged by a forward pair of spaced apart toothed wheels 133A and a rearward pair of spaced apart toothed wheels 133B mounted to respective axles 139A, 139B, which are rotatably mounted to a conveyor frame 135. Conveyor frame 135 is mounted at an angle to the elongate side members 103 by mounting brackets 137 on both sides of the conveyor 120. The conveyor 120 is driven by a motor 125 and a belt arrangement that is concealed in or behind a housing 127 for safety. The belt drive also reduces the operating noise of the mulch retriever 100. The belt is coupled to, and drives, axle 139B to which rearward pair of spaced apart toothed wheels 133B are mounted to drive the conveyor 120. Guards 129 are provided either side of the conveyor 120 mounted to the conveyor frame 135, also for safety purposes. Guards 129 cover the looped chains 123 and a space rearward of the conveyor 120.

The conveyor 120 vibrates to aid removal of soil, earth, stones and other debris attached to the plastic mulch. The level or degree of vibration is determined by three substantially aligned wheels 131 in the centre of the conveyor. The bars 122 roll over the wheels 131 and are thus vibrated. The level of vibration is determined by the height of the wheels 131, which is adjustable. Wheels 131 are rotatably mounted to a pair of arms 141, which are mounted to transverse members 143 of the conveyor frame 135.

The conveyor 120 is inclined at an angle relative to the elongate side members 103 and conveys the plastic mulch from just above ground level at a front of the conveyor 120 to well above ground level toward a rear of the conveyor 120 and the mulch retriever 100. The conveyor 120 is positioned such that the projections 124 of the rattler bars 122 engage and effectively rake the ground. According to some embodiments, the angle and height of the conveyor 120 are also adjustable to suit the terrain from which the mulch is being retrieved.

According to some embodiments, the projections 124 are omitted from the rattler bars 122 and the rattler bars 122 engage and effectively rake the ground directly. The adjustable angle and height of the conveyor 120 enable the degree of engagement of the rattler bars 122 with the ground to be varied, for example, according to the hardness of the ground and the depth of the mulch beneath the surface.

Toward a rear of the mulch retriever 100, at least one storage device 126 is mounted to the body 102 rearward of the conveyor 120 to store the retrieved plastic mulch. According to the embodiment shown in FIGS. 1-3, the storage device 126 is in the form of a pair of aligned, rotatably mounted rollers 128 as is known from the prior art. The rollers 128 are substantially conical in shape and rotatably mounted with their points facing each other. The rollers 128 releasably lock together at their points via a locking mechanism 130 and are separable when they are full to allow the bundle of retrieved mulch material to fall to the ground or otherwise be removed therefrom. As the plastic mulch leaves the conveyor 120, it is tied to and wrapped around the rotating rollers 128. The rollers 128 are rotated by a motor 132 at a speed dependant on the speed of the powered vehicle (not shown) pulling the mulch retriever 100 and the diameter of the bundle of mulch on the rollers 128. The speed of rotation of the rollers is variable. For example, if the mulch retriever 100 is moving along at a constant speed, as the diameter of the retrieved bundle of mulch wrapped around the rollers 128 increases, the speed of rotation of the rollers 128 is reduced.

Figure 4:
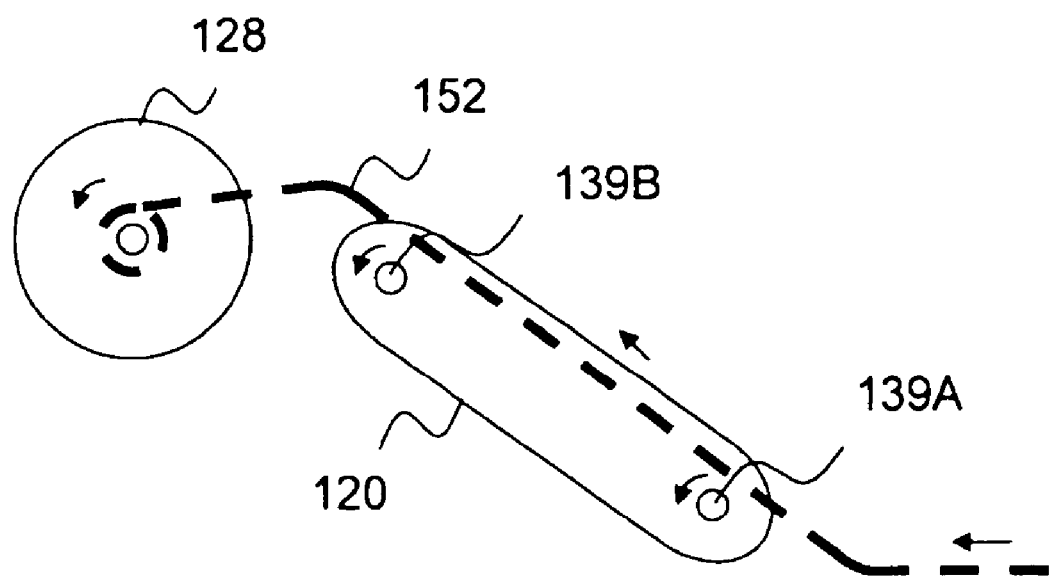
FIG. 4 is a schematic side view showing the plastic mulch passing through the plastic mulch retriever shown in FIG. 1.

With additional reference to FIG. 4, in contrast to some of the prior art devices, in embodiments of the present invention, rearward of the conveyor 120, the plastic mulch 152 passes first over the top of the rollers 128 of the storage device 126 and then underneath the rollers 128 as the plastic mulch 152 is wrapped around the rollers 128. When the mulch retriever 100 is viewed from the left hand side with the front of the mulch retriever 100 on the right hand side, as shown in FIG. 4, the rollers 128 at the rear rotate in an anticlockwise direction as indicated by the arrow shown on the side of the rollers 128. It will be appreciated that when the mulch retriever 100 is viewed from the right hand side with the front of the mulch retriever 100 on the left hand side, the rollers 128 rotate in a clockwise direction. The inventor has identified that passing the plastic mulch 152 first over the top of the rollers 128 of the storage device 126 enables more debris to fall from the plastic mulch, for example, from the rear of the mulch retriever 100, before the plastic mulch 152 is wrapped around the rollers 128. In some of the prior art devices, the plastic mulch first passes underneath the rollers and the debris becomes trapped between the plastic mulch and the rollers 128 or previously wound layers of plastic mulch and is bundled up with the plastic mulch as the rollers rotate. Therefore, in embodiments of the present invention, more dirt is removed from the plastic mulch compared with at least some of the prior art devices.

The speeds of the motor 132 and the motor 125 for driving the conveyor 120 are controlled by an operator standing in the compartment 134 mounted to one of the elongate side members 103 of the body 102. Compartment 134 can be made from suitable members, preferably made of steel or other suitable metal, bolted or welded together, a perforated base and a hinged gate to allow access to the compartment. Motors 125, 132 can be hydraulic motors driven by a hydraulic pump and circuit or can be implemented by suitable gearing.

To enable the rollers 128 to be separated when they are full or to otherwise remove the bundle of retrieved mulch, each elongate side member 103 is provided in two parts and joined together by a hinge 136. A hydraulic ram 138 is provided on the outside of each elongate side member 103 and is rotatably coupled at each end to a respective elongate side member 103 via brackets 140. Once motor 132 driving the rollers 128 has been stopped, locking mechanism 130 is released and hydraulic rams 138 are retracted such that end portions 142 of the elongate side members 103 pivot outwardly about hinges 136. Rollers 128 separate and the bundle of retrieved mulch falls to the ground or can be removed from one of the rollers. Although the embodiment shown in the drawings comprises each elongate side member 103 being provided in two parts and joined together by a respective hinge 136, it is envisaged that in alternative embodiments just one side member 103 is provided in two parts and joined together by a hinge 136 such that only one elongate side member 103 pivots outwardly to allow the bundle of retrieved mulch to be removed or fall to the ground.

A pair of wheels 144 are rotatably mounted to the elongate side members 103 by any suitable means to provide support for the mulch retriever 100. A hitch arrangement 146 comprising a plurality of hitching brackets 148 is welded to a forward one of the elongate transverse members 105 to facilitate hitching of the mulch retriever 100 to one of a range of powered vehicles with different hitch attachments, such as a tractor (not shown). Strengthening bars 150 extend substantially diagonally between the hitch arrangement 146 and the elongate side members 103 and are welded thereto.

It is envisaged that embodiments of the present invention can be used to retrieve buried or partially embedded flexible sheeting material other than plastic mulch. For example, it is envisaged that embodiments of the present invention can be used to retrieve silt fencing that is inserted in the ground to prevent soil erosion.

Advantages of the present invention include the projections 124 of the transverse (rattler) bars 122 engaging and vibrating the plastic mulch to shake free the majority, if not all, of the dirt, earth and soil attached to the mulch before it is rolled around the rollers 128. Passing the plastic mulch 152 first over the rollers 128 after the plastic mulch leaves the conveyor 120 aids in maximising the removal of dirt, earth and soil etc. from the plastic mulch and reduces the likelihood of such debris being trapped in the bundled mulch. The amount of soil and therefore nutrients removed from the growing area is thus reduced compared with the prior art devices. Also, the mass of the mulch bundle for disposal is therefore reduced, which in turn reduces the cost of disposal where the cost is based on the mass of the bundle. Furthermore, the amount of mulch that can be captured by the rollers 128 is increased because soil is not attached to the mulch, which would otherwise occupy volume in the bundle. Consequently, fewer interruptions to empty full rollers are experienced with the present invention, thus contributing to overall efficiency.

Throughout the specification the aim has been to describe the invention without limiting the invention to any one embodiment or specific collection of features. Persons skilled in the relevant art may realize variations from the specific embodiments that will nonetheless fall within the scope of the invention.

The invention claimed is:

1. A plastic mulch retriever comprising:
   a body;
   at least one cutting or digging element mounted to the body to loosen plastic mulch embedded in the ground;
   a conveyor adapted to vibrate and mounted to the body rearward of the at least one cutting or digging elements such that a front of the conveyor is just above ground level, the conveyor comprising a plurality of substantially transverse bars comprising a plurality of projections to engage the loosened plastic mulch and remove at least some of the ground material attached to the extracted mulch; and
   at least one storage device mounted to the body rearward of the conveyor to store the retrieved plastic mulch.

2. The plastic mulch retriever of claim 1, wherein the at least one cutting or digging element comprises one or more substantially vertically mounted coulter wheels.

3. The plastic mulch retriever of claim 1, wherein the at least one cutting or digging element comprises one or more substantially horizontally mounted angled cutting blades.

4. The plastic mulch retriever of claim 1, wherein the at least one cutting or digging element comprises one or more blades substantially aligned with elongate side members of the body and angled toward the ground.

5. The plastic mulch retriever of claim 1, wherein the storage device comprises a pair of rollers rotatably mounted to the body, the pair of rollers releasably connected by a locking mechanism.

6. The plastic mulch retriever of claim 5, wherein the retrieved plastic mulch passes first over the top of the rollers and then underneath the rollers as the plastic mulch is wrapped around the rollers.

7. The plastic mulch retriever of claim 5, wherein a speed of rotation of the rollers is adjustable and is adjusted according to a speed of the plastic mulch retriever.

8. The plastic mulch retriever of claim 5, wherein a speed of rotation of the rollers is adjustable and is adjusted according to a diameter of a bundle of mulch on the rollers.

9. The plastic mulch retriever of claim 1, wherein a position along the body at which the conveyor is mounted is adjustable.

10. The plastic mulch retriever of claim 1, wherein a height of the conveyor relative to the body and the ground is adjustable.

11. The plastic mulch retriever of claim 1, wherein an angle of inclination of the conveyor relative to the body is adjustable.

12. The plastic mulch retriever of claim 5, wherein the body comprises a pair of spaced apart elongate side members, at least one of the elongate side members being in two parts joined together by a hinge allowing one part to which one of the rollers is mounted to pivot relative to the other part.

* * * * *